United States Patent [19]
Daoud

[11] Patent Number: 6,157,714
[45] Date of Patent: Dec. 5, 2000

[54] MODULAR LAYERED NETWORK INTERFACE UNIT PARTICULARLY SUITED TO A TWO-LAYER ARRANGEMENT

[75] Inventor: Bassel Hage Daoud, Parsippany, N.J.

[73] Assignee: Lucent Technologies, Inc., Murray Hill, N.J.

[21] Appl. No.: 09/143,316

[22] Filed: Aug. 28, 1998

[51] Int. Cl.⁷ ............................... B65D 6/00; H04M 3/00
[52] U.S. Cl. ........................................ 379/399; 220/4.02
[58] Field of Search .................................... 379/399, 412, 379/328, 413, 387, 327, 330, 331, 332; 220/4.02

[56] References Cited

U.S. PATENT DOCUMENTS

| | | |
|---|---|---|
| Re. 35,929 | 10/1998 | Daoud ...................................... 379/399 |
| 5,235,638 | 8/1993 | Dondero ................................... 379/399 |
| 5,363,440 | 11/1994 | Daoud ...................................... 379/399 |
| 5,550,916 | 8/1996 | Daoud ...................................... 379/399 |
| 5,803,292 | 9/1998 | Daoud ...................................... 220/4.02 |
| 6,025,557 | 2/2000 | Daoud ................................... 174/85 G |

*Primary Examiner*—David R. Hudspeth
*Assistant Examiner*—Susan Wieland
*Attorney, Agent, or Firm*—Howard C. Miskin; Gloria Tsui-Yip

[57] ABSTRACT

A network interface unit with a base and cover having two layers of equipment with the upper layer being hinged to the base and the cover being hinged to an extension of the base. The hinged arrangement allows the cover and one of the layers of the equipment to be swung out to facilitate maintenance.

5 Claims, 5 Drawing Sheets

6,157,714

MODULAR LAYERED NETWORK INTERFACE UNIT PARTICULARLY SUITED TO A TWO-LAYER ARRANGEMENT

CROSS REFERENCE TO RELATED APPLICATION

This application is related to U.S. patent application having Ser. No. 09/143,314, identified by Docket Number Daoud 119 and is assigned to the same assignee as the present invention.

BACKGROUND OF THE INVENTION

This invention relates to telecommunications apparatus and, in particular, to network interface units and building entrance protector units.

Network interface units are known in the art and one such unit is disclosed in U.S. Pat. No. 5,363,440 ('440) of Daoud, and which is herein incorporated by reference. As discussed in the '440 patent, network interface units constitute the demarcation between the customer's equipment and the telephone network. In buildings including multiple subscribers, the network interface unit is typically mounted in a basement and includes an array of customer bridges, each bridge being coupled to an individual subscriber line. The bridges are typically coupled to the phone network through an RJ11 jack and plug so that the customer can plug a working phone into the jack to determine if any problems lie in the customer or network side of the telecommunications system.

Network interface units typically also include a building entrance protector portion which comprises a cable splice chamber and a protector field device for providing surge protection for each customer. The network interface unit typically provides a first level that houses all of the associated circuit components of the protector portion, a second level that houses all of the associated circuit components of the customer bridge and a cover mounted over the second level. This arrangement is plagued with drawbacks such that the cover obstructs the view of a service technician from seeing both levels simultaneously. It is desired to have an arrangement for a network interface unit where its cover is more conveniently mounted so as to allow for both first and second levels of the network interface unit to be viewed simultaneously and to facilitate access to both sides of the second levels so as to ease the maintenance task of the service technician of the unit.

SUMMARY OF THE INVENTION

The invention in one aspect is a network interface unit for servicing a multiplicity of subscribers.

The network interface unit has a base portion and a cover portion and, in one embodiment, comprises a bottom portion mounted on the base portion and including a splice chamber and an array of protector devices mounted thereon. The splice chamber includes wiring for connecting a cable to the protectors. The network interface unit further comprises a modular layer, a tray and a first hinge. The modular layer includes at least an array of customer bridges each adapted for coupling to a different line of a subscriber and each array having cabled wiring to electrically connect to respective protective devices mounted in the bottom portion. The tray has first and second sides and holds the respective modular layer. The tray has at least one opening at its first side for allowing passage of cabled wiring. The first hinge has first and second ends with one of the ends attached to the first side of the tray having the opening and the other end of the hinge attached to the base portion.

BRIEF DESCRIPTION OF THE DRAWINGS

These and other features of the invention are delineated in detail in the following description. In the drawings.

It will be appreciated that, for purposes of illustration, these figures are not necessarily drawn to scale.

DETAILED DESCRIPTION OF THE PREFERRED EMBODIMENTS

Figure 1:
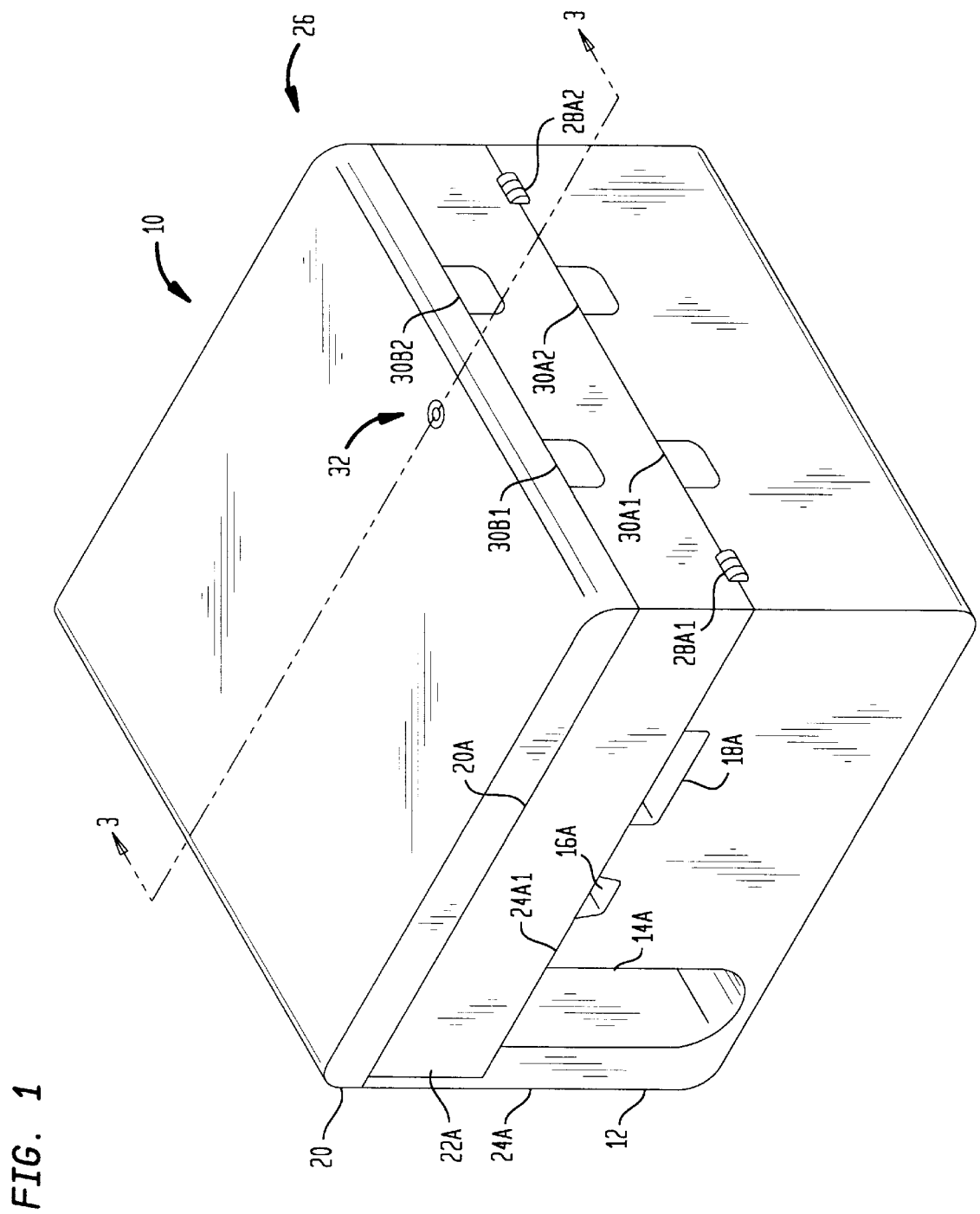
FIG. 1 is a front perspective view of a network interface unit in accordance with an embodiment of the invention and illustrated therein to show the first side of the network interface unit.

FIG. 1 illustrates primarily the network interface unit 10 in accordance with the invention. The network interface unit 10 is comprised of a modular layer, such as 22A having a hinge side and openings for allowing the passage of wires to and from the modular layers and, in some cases, to and from the network interface unit 10 itself. The network interface unit further comprises a cover 20 and a protective unit 60 (shown in FIG. 4) electrically connected to the modular layer. The network interface unit 10 provides for an arrangement so that its cover 20 and its modular layer, such as 22A may both be swung open and the protective unit viewed, as well as the simultaneously viewing of the top and bottom regions of the modular layer, such as 22A. The modular layer, such as 22A, allows for the mounting of panels or electrical devices thereon, whereas the panels allow for mounting of other components, such as telephone and fiber optic equipment. One of the sides of the network interface unit preferably includes a security mechanism, such as screws and screw receptacles.

The network interface unit 10 of FIG. 1, has a base portion 12 having openings 14A, 16A and 18A all providing passageways for the entrance and/or exit of cabling. The network interface unit 10 further has a cover portion 20 having a lower edge portion 20A.

The network interface unit 10 further comprises a modular layer 22A which is preferably mounted in a tray 24A having a lower edge portion 24A1.

The network interface unit 10 is illustrated in FIG. 1 so as to expose the first side 26 of the network interface unit 10. The network interface unit 10 has a plurality of hinges 28A1 and 28A2 that respectively operatively cooperate with the base 12 and the tray 24A in a manner to be more fully described hereinafter with reference to FIG. 5.

The network interface unit 10 further comprises a plurality of openings or windows 30A1–30A2 and 30B1–30B2 that are used to more advantageously dress the cabling associated with the modular layer 22A. The windows 30A1 . . . 30B2, as well as other windows of the network interface unit 10, also provide the means for ingress or egress of cabling associated with the network interface unit 10.

Figure 2:
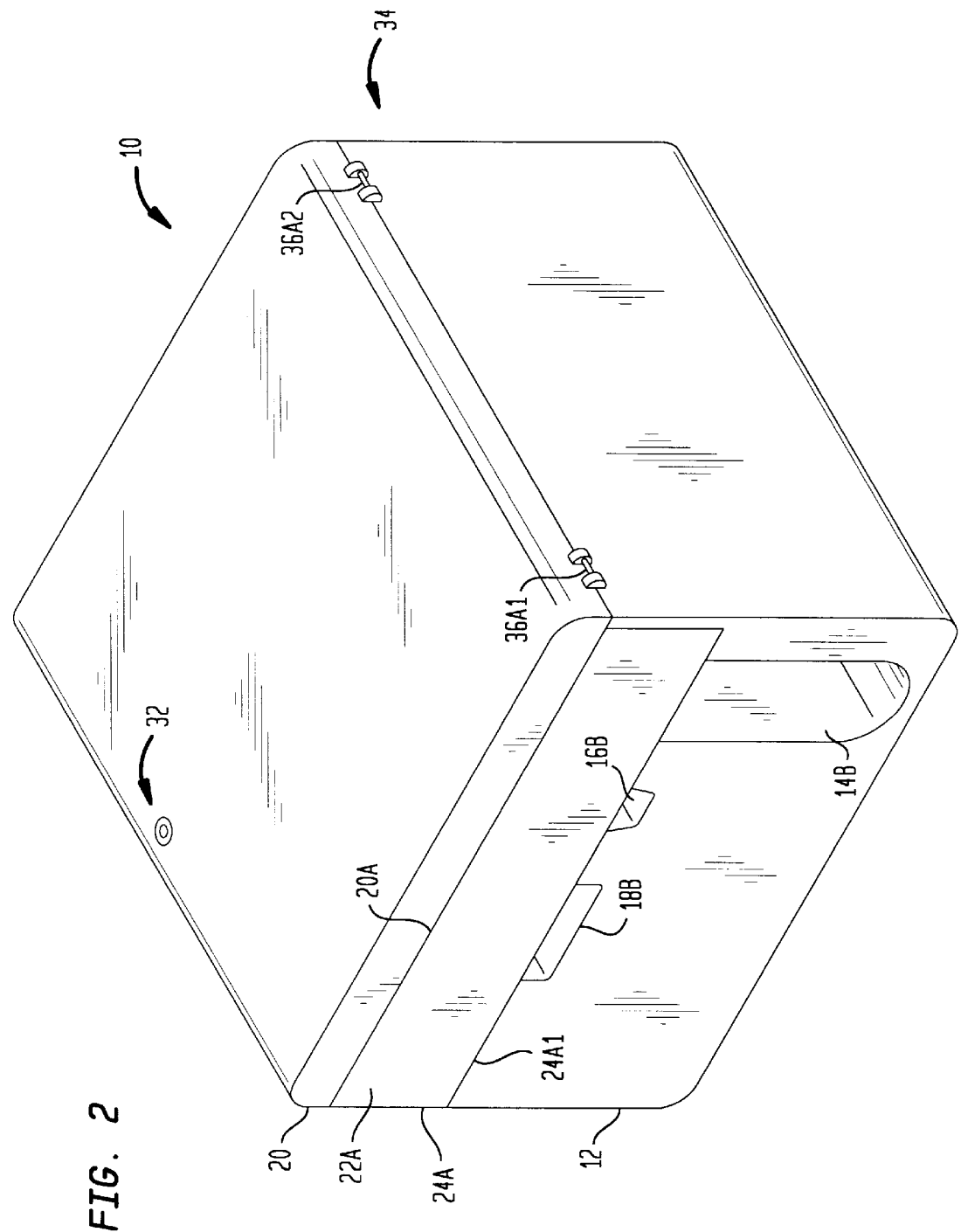
FIG. 2 is a rear perspective view and illustrated to show the second side of the network interface unit.

The cover 20 further includes a screw and screw receptacle arrangement 32 dimensioned for complementary mating therebetween and that may be used to connect/disconnect the cover 20 to the tray 24A. The network interface unit 10 further comprises a second side 34 which is more clearly illustrated in FIG. 2.

The cover 20 further comprises a second hinge arrangement 36A1 and 36A2. The internal components making up the network interface unit 10 may be further described with reference to FIG. 3 which is a view taken along line 3—3 of FIG. 1.

Figure 3:
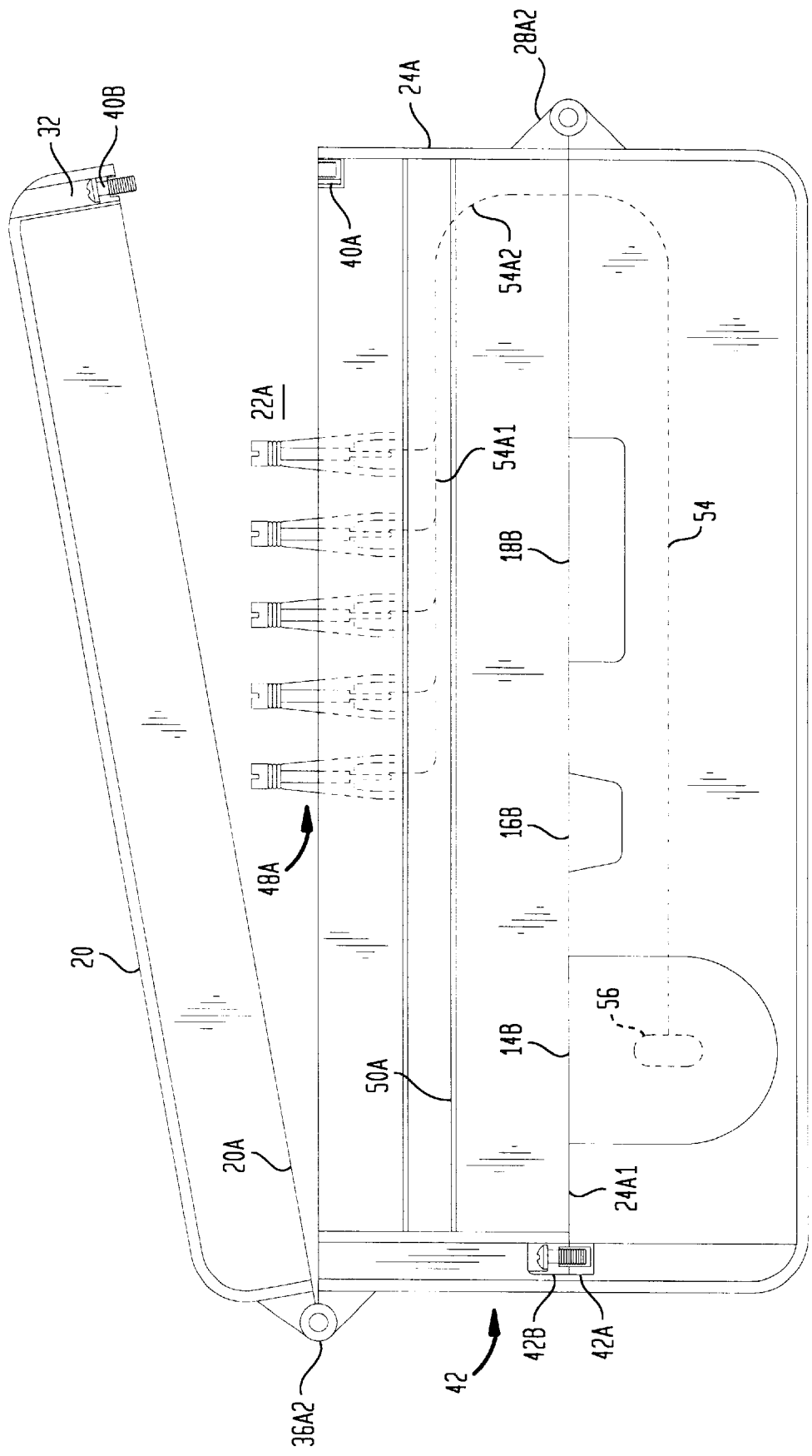
FIG. 3 is a view of the network interface unit taken along line 3—3 of FIG. 1.

FIG. 3 illustrates a screw receptacle 40A and a screw 40B, both part of the screw arrangement 32 of cover 20 of FIG. 1, and both of which are dimensioned for complementary mating therebetween and with screw receptacle 40A being located in an upper section of tray 24A and the screw 40B attached to the cover 20. Further, FIG. 3 illustrates the tray 24A as having a second screw arrangement 42 with a receptacle 42A attached to the second side of base 12, that is, the side opposite the first side of base 12 that has the hinge 28A2 attached thereto. The second screw arrangement 42 has a screw 42B attached to the second side of tray 24A.

The modular layer 22A is shown as being lodged in tray 24A, and includes a customer bridge 48A, which is more fully described in the previously mentioned U.S. Pat. No. 5,363,440. The modular layer 22A further includes an electrical device 50A which is preferably a panel that allows for the mounting of electronic components, such as those components found in telephone and fiber optic equipment. More particularly, the panel 50A may serve as a motherboard for the mounting of the data-processing devices.

FIG. 3 further shows cabled wiring for the network interface device 10 as comprising a cable run 54. The cable run 54 represents the wiring to and from the network interface unit 10 and, in FIG. 3 illustrates, a cable run 54A1 that supplies the cabling to and from devices 48A and 50A. The cable run 54 also includes the cabling that connects the network interface unit 10 to external equipment (not shown). The tray 24A provides an opening 54A2 on its first or hinged side to allow for the passage of the cable run 54. The cable run 54 is connected to a generally shown connector 56 which connects the customer bridge 48A to a protective unit 60 which may be further described with reference to FIG. 4.

Figure 4:
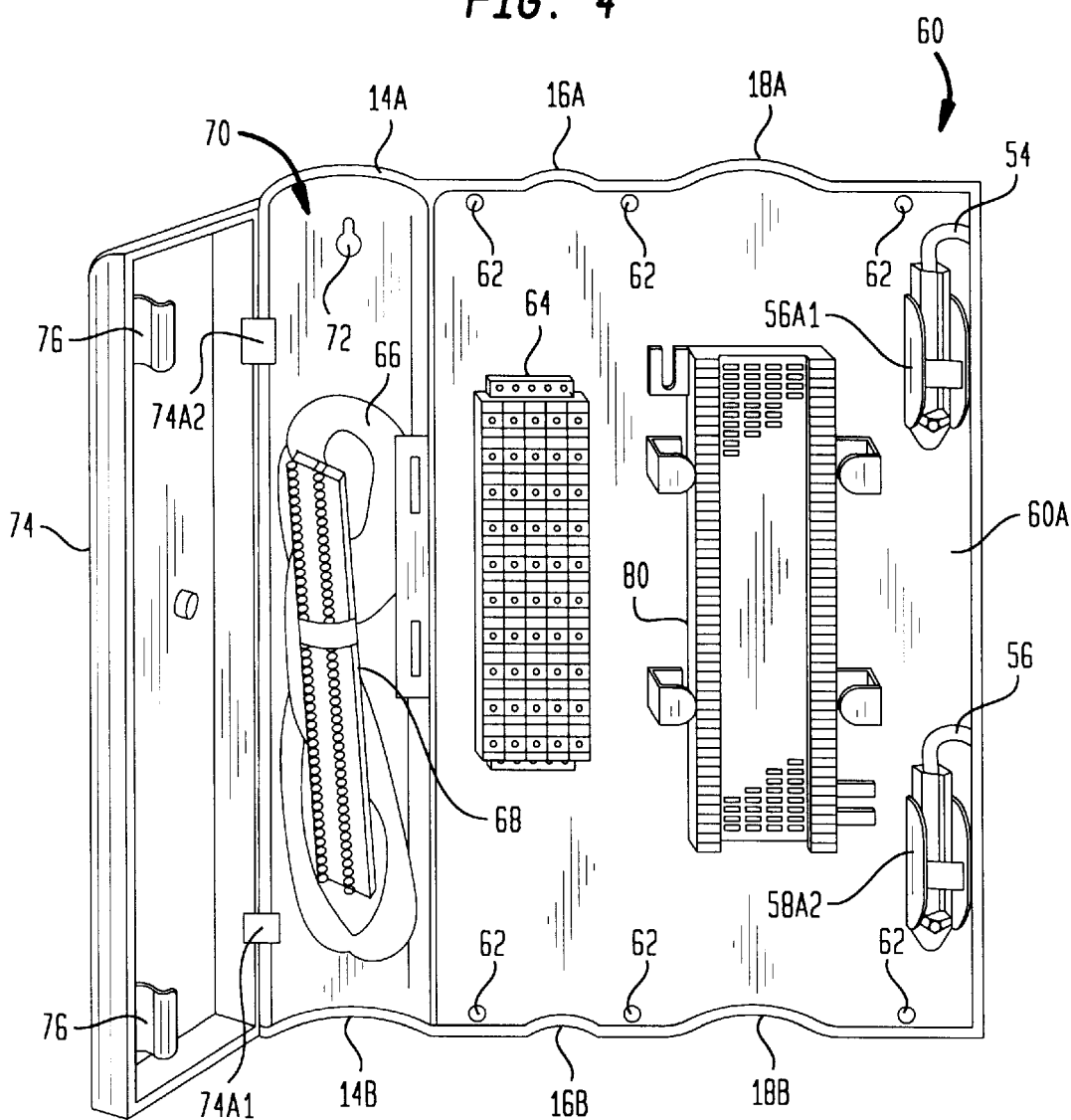
FIG. 4 is a front perspective view of the protector unit in accordance with one embodiment of the present invention.

FIG. 4 illustrates a building entrance protector unit 60 having the cable run 54 interconnected thereto by a connector 56 which is comprised of two separate connectors 56A1 and 56A2 both being conventional types. The protector unit 60 is located on base 12 of the network interface unit 10 having the openings 14A, 16A and 18A of FIG. 1 which are respectively arranged, in a complementary manner, relative to openings 14B, 16B and 18B of the network interface unit 10. The protector unit 60 is mounted to a frame member 60A by way of fasteners 62, or other equivalent means. The protector unit 60 includes an array 64 of protective devices with each protector device of array 64 being typically a solid state surge arrester which is plugged into a socket (not shown) mounted to the protective unit 60, in particular, the frame member 60A of the protector unit 60. The array 64 of protectors is electrically coupled to a bundle of wires 66 which terminate in a splice connector 68.

The splice connector 68, known in the art, provides the capability for connecting a cable to the protective array 64. The splice connector 68 and the major portion of the wire bundle 66 are situated within a splice chamber 70. The chamber 70 includes the openings 14A and 14B serving as cable passageways, whereas the other openings or cable passageways 16A, 16B, 18A and 18B are located under the protective unit 60. The back wall of the splice chamber 70 includes a hole 72 which permits wall mounting of the network interface unit 10. A cover 74 is mounted by way of clip members 76 and 78 and hinges 74A1 and 74A2, to the splice chamber 70 to protect the splices formed therein.

Also mounted on the protective unit 60 is a cross-connect or tapping field device 80. Such a field device 80, which is standard in the art, includes an array of connectors, each coupled between a protector and an associated customer bridge by way of the previously described cable run 54. By applying jumper cables (not shown) to the connectors, connections can be changed between protectors and customer bridges when, for example, a customer changes his or her location in the building.

The overall benefits of the network interface unit 10 of the present invention may be further described with reference to FIG. 5 which illustrates the arrangement of FIG. 3 in its folded-out positions. From FIG. 5 it is seen that the cable run 54 is provided with sufficient slack so that the modular layer 22A may be folded out so as to reveal the components thereof and the wiring and wire wraps thereunder. Such fold-out capabilities of the network interface unit 10 allow for any maintenance thereon of all of the components of the modular layer 22A.

Figure 5:
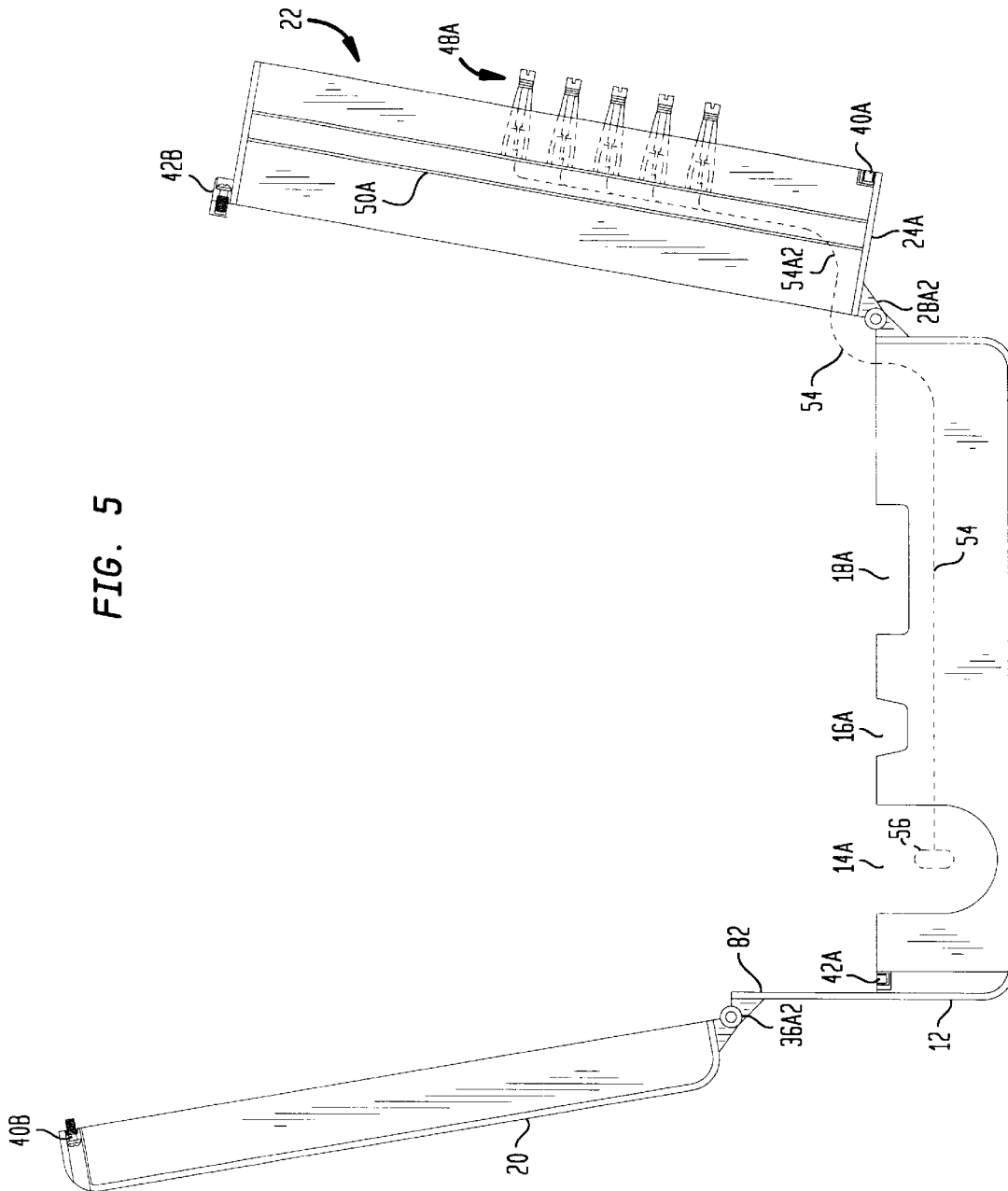
FIG. 5 illustrates the fold-out capabilities, especially the cover, of the present invention.

Further, from FIG. 5 it is seen that the hinges, such as hinges 28A2 and 36A2, have motion limits that define the movement and the open positions of the modular layer 22A (mounted in tray 24A) and the cover 20, respectively. These motion limits are defined by the two members (28A1 and 28A2) attached to associated tray 24A and base 12 and the two members (36A1 and 36A2) attached to the cover 20 and to the base 12, that is, to an extension 82 of the base 12.

FIG. 5 illustrates the modular layer 22A, as being interconnected by the hinges 28A2, but allowing the modular layer 22A to be separately swung out to its open positions. If desired, the modular layer 22A may be interconnected to base 12. For example, if the screw 42B attached to tray 24A is interconnected to the receptacle 42A attached to the base 12, then the first modular layer 22A would not only rest upon the base 12 while still allowing for the cover 20 to be individually swung out of the way. Further, if the screw 40B of cover 20 is interconnected to the receptacle 40A of the tray 24A, then cover 20 would be connected to the tray 24A which, in turn, is connected to the base 12.

From FIG. 5, it is seen that cover 20 being attached to the extension 82 is easily swung out of the way so that the top and bottom regions of the modular layer 22 may be examined or worked on, while at the same time the top region of the protector unit 60 of FIG. 4 may also be examined and worked on.

It should now be appreciated that the practice of the present invention provides for a network interface unit 10 having a modular layer and a protector unit that may be consecutively arranged or stacked on one another so that the needed components for the network interface unit may be lodged therein while yet allowing for separate examination of the modular layer and protector unit for maintenance purposes.

Various additional modifications will become apparent to those skilled in the art. All such variations which basically rely on the teachings to which the invention has advanced the art are properly considered within the scope of this invention.

What I claim is:

1. A network interface unit with a base portion having first and second sides and mounted therein a bottom portion including a splice chamber and an array of protector devices mounted thereon, said splice chamber including wiring means for connecting a cable to said protector devices for servicing a multiplicity of subscribers, said unit comprising:

a modular layer including at least an array of customer bridges each adapted for coupling to a different line of a subscriber and each array having cabled wiring to electrically connect the customer bridges to respective protective devices mounted in said bottom portion;

a tray having first and second sides and holding said modular layer and having at least one opening at said first side thereof for allowing passage of said cabled wiring;

a first hinge having first and second ends with one of said ends pivotally attached to said first side of said tray having said opening and the other end of the hinge pivotally attached to said first side of said base portion; and a cover for said unit pivotally attached to said second side of said base portion.

2. The network interface unit according to claim 1, wherein at least one of said plurality of modular layers further comprises at least one electrical device and said cabled wiring further comprises wiring for electrically connecting said at least one electrical device to said array of customer bridges within its respective modular layer.

3. The network interface unit according to claim 2, wherein said cabled wiring for said at least one electrical device further comprises wiring for electrically connecting said at least one electrical device to said array of protective devices.

4. The network interface unit according to claim 1, wherein said first side of said base being proximate said opening of said tray and said cover has first and second sides and further comprising:

a plurality of sets of screws and screw receptacles dimensioned for complementary mating therebetween and said plurality having a first and a second set, said first set having its receptacle mounted to said second side of said base and its screw mounted to said second side of said first tray and said second set having its screw mounted to said second side of said cover and its receptacle mounted to said first side of said tray.

5. The network interface unit according to claim 4, wherein said base has a member extending upward from its second side and further comprising a second hinge having first and second ends with the first end pivotally connected to the first side of said cover and the second end pivotally connected to said upwardly extending member.

* * * * *